United States Patent
Garcia

(10) Patent No.: US 7,438,655 B2
(45) Date of Patent: Oct. 21, 2008

(54) HOCKEY STICK BLADE HAVING RIB STIFFENING SYSTEM

(75) Inventor: Gregory Isaac Garcia, San Diego, CA (US)

(73) Assignee: Warrior Sports, Inc., Warren, MI (US)

( * ) Notice: Subject to any disclaimer, the term of this patent is extended or adjusted under 35 U.S.C. 154(b) by 0 days.

(21) Appl. No.: 11/755,173

(22) Filed: May 30, 2007

(65) Prior Publication Data

US 2007/0281810 A1 Dec. 6, 2007

Related U.S. Application Data

(60) Provisional application No. 60/810,221, filed on Jun. 1, 2006.

(51) Int. Cl.
*A63B 59/14* (2006.01)

(52) U.S. Cl. ..................................... 473/563

(58) Field of Classification Search .......... 473/560–563
See application file for complete search history.

(56) References Cited

U.S. PATENT DOCUMENTS

| | | | |
|---|---|---|---|
| 3,561,760 A | 2/1971 | Klay | |
| 4,076,240 A | 2/1978 | Haddad | |
| 5,407,195 A * | 4/1995 | Tiitola et al. ................. | 473/563 |
| 5,632,481 A | 5/1997 | Unger et al. | |
| 5,697,857 A | 12/1997 | Christian et al. | |
| 5,810,684 A | 9/1998 | Ohman | |
| 5,836,841 A | 11/1998 | Fell | |
| 6,019,691 A * | 2/2000 | Hilborn ....................... | 473/563 |
| 6,062,996 A * | 5/2000 | Quigley et al. ............... | 473/563 |
| 6,626,775 B2 * | 9/2003 | Tiitola ......................... | 473/563 |
| 6,918,847 B2 | 7/2005 | Gans et al. | |
| 7,044,870 B2 * | 5/2006 | Pagotto ....................... | 473/563 |
| 7,294,072 B2 | 11/2007 | Montecchia | |
| 7,326,136 B2 * | 2/2008 | Jean et al. .................... | 473/563 |
| 2003/0004019 A1 * | 1/2003 | Lussier et al. ................ | 473/563 |
| 2003/0104883 A1 * | 6/2003 | Caron ......................... | 473/560 |
| 2003/0119612 A1 | 6/2003 | Goldsmith et al. | |
| 2004/0198538 A1 * | 10/2004 | Goldsmith et al. .......... | 473/563 |
| 2004/0229720 A1 | 11/2004 | Halko et al. | |
| 2005/0090339 A1 * | 4/2005 | Gans et al. ................... | 473/561 |
| 2005/0113194 A1 | 5/2005 | Pearson | |
| 2006/0089215 A1 * | 4/2006 | Jean et al. .................... | 473/560 |

FOREIGN PATENT DOCUMENTS

CA 2446496 A1 4/2005

\* cited by examiner

*Primary Examiner*—Mark S Graham
(74) *Attorney, Agent, or Firm*—Warner Norcross & Judd LLP

(57) ABSTRACT

A composite hockey stick blade having a rib stiffening system. The rib stiffening system consists of one or more internal wall structures, or ribs, located within strategic portions of the rear face of the paddle that provides localized regions of increased longitudinal stiffness located within the overall structure of the paddle. These ribs may also control the torsional rigidity of the paddle. The ribs also reduce the weight of the blade without reducing the stiffness and rigidity of the blade. The hockey stick blade may be utilized as a replacement blade for a two-piece hockey stick, or may be a portion of a one-piece hockey stick.

14 Claims, 3 Drawing Sheets

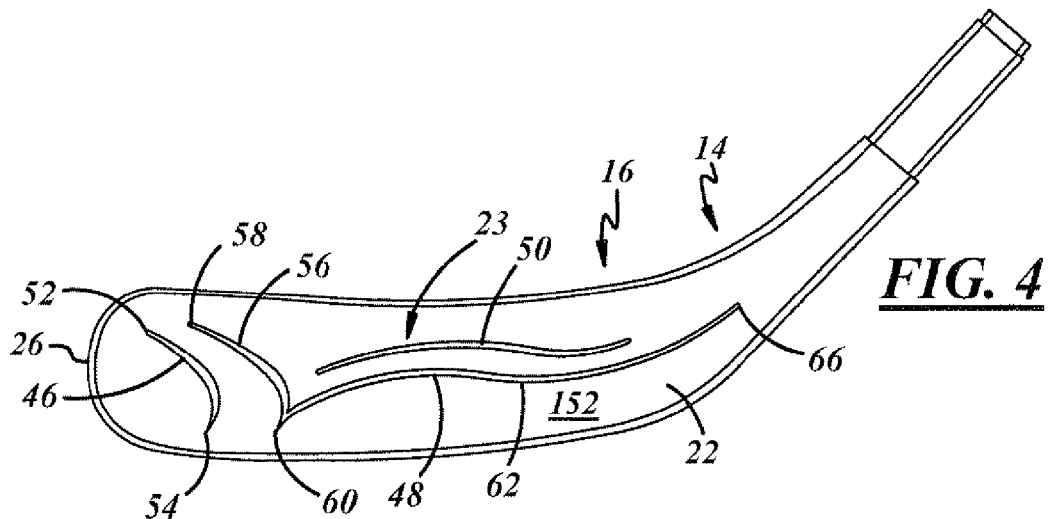
*FIG. 4*
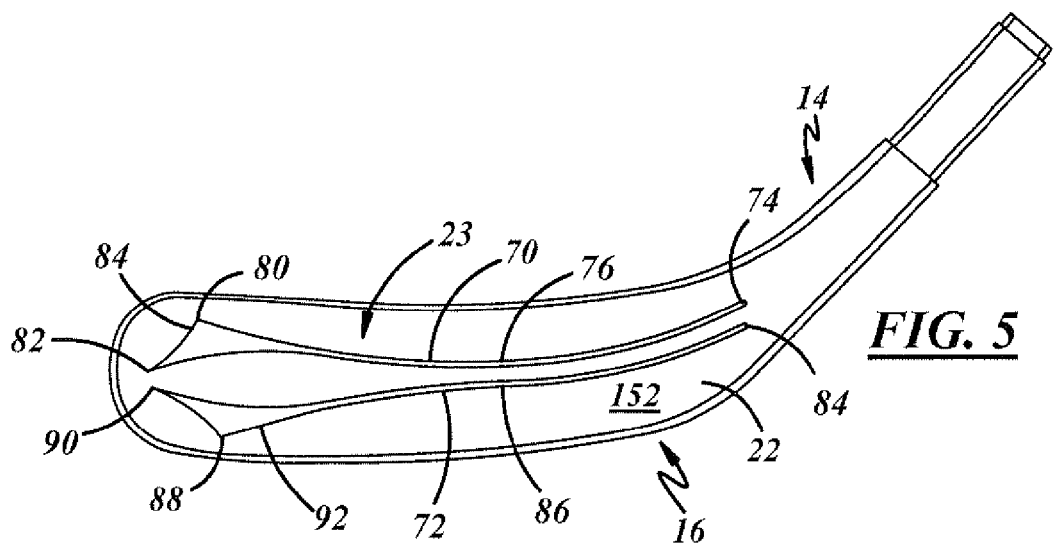
*FIG. 5*
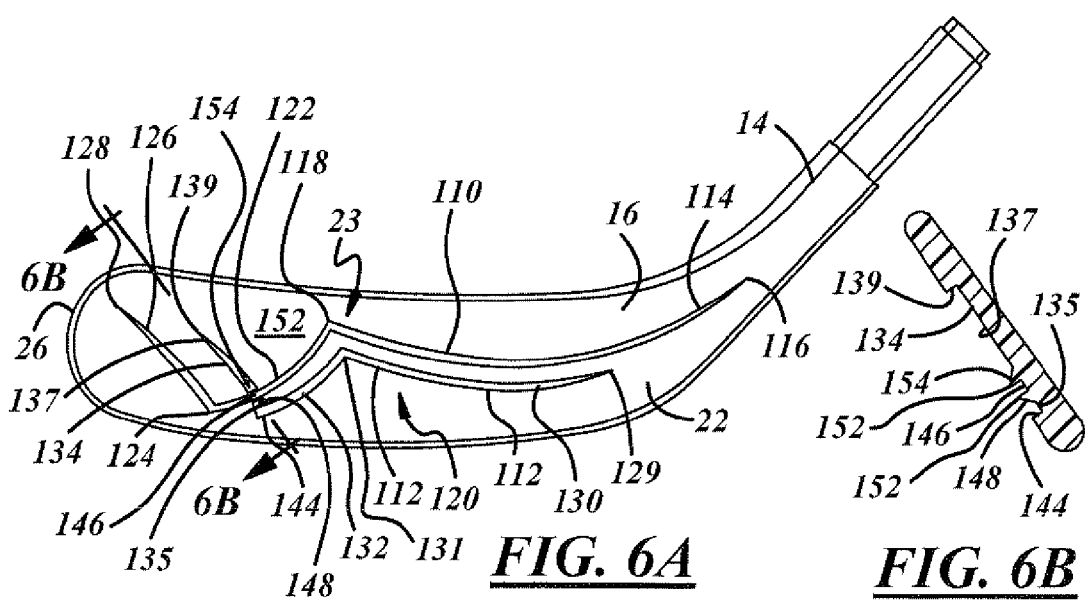
*FIG. 6A*     *FIG. 6B*

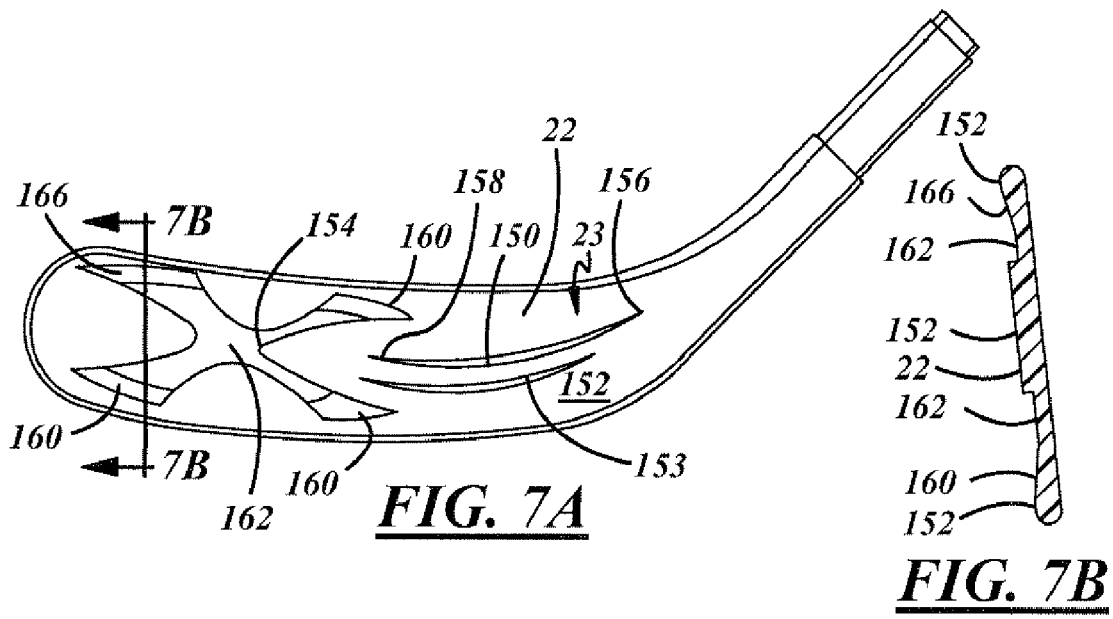
FIG. 7A
FIG. 7B
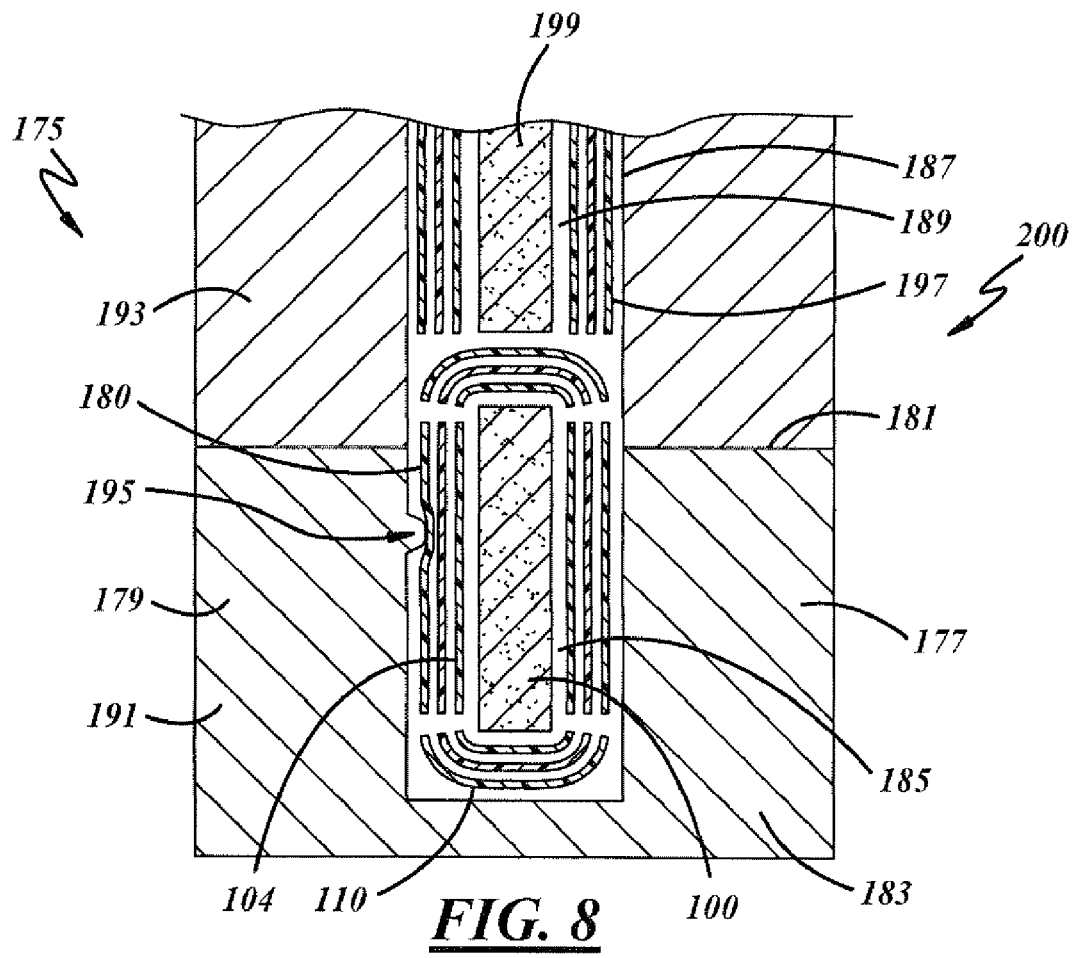
FIG. 8

HOCKEY STICK BLADE HAVING RIB STIFFENING SYSTEM

CROSS REFERENCE TO RELATED APPLICATIONS

The present invention claims priority from U.S. Provisional Patent Application Ser. No. 60/810,221, filed Jun. 1, 2006, and entitled "Hockey Stick Blade Having Rib Stiffening System", which is hereby incorporated by reference.

TECHNICAL FIELD

The present invention relates generally to a hockey stick blade and, more particularly to, a hockey stick blade having a rib stiffening system.

BACKGROUND OF THE INVENTION

It is therefore an advantage of the present invention to provide a composite blade for a hockey stick with improved response while handling and/or shooting a puck.

It is another advantage of the present invention to provide a composite blade for a hockey stick that assists in preventing puck "flutter" that may occur when a player shoots or passes the puck.

It is a related advantage of the present invention to provide a composite blade for a hockey stick that minimizes twisting of the blade.

It is still another advantage of the present invention to provide a composite blade for a hockey stick that has decreased weight without adversely affecting the performance or mechanical characteristics of the blade.

In accordance with the above and the other advantages, the present invention provides a composite hockey stick blade having a rib stiffening system. The rib stiffening system consists of one or more ribs incorporated within a rear face of the paddle portion of the blade. The ribs create an internal wall structure that runs inwardly with respect to the rear face of the paddle portion. The ribs provide regions of increased stiffness within the overall structure of the paddle. The location of the rib or ribs allows the flexing and twisting characteristics of the paddle to be precisely controlled depending upon the blade's desired mechanical characteristics to enhance the player's shooting and passing ability. The addition of ribs horizontally along the length of the paddle is shown to increase the stiffness of the paddle longitudinally, while the addition of ribs semi-vertically increases the torsional rigidity of the paddle, therein minimizing twisting of the paddle that may occur during use, such as when a player shoots or passes a puck.

A secondary result of adding the rib stiffening system to the rear face of the paddle of the blade is an incremental decrease in the total weight of the blade, and a cost savings realization in terms of reduced material usage. In accordance with one embodiment, the ribs are essentially removed regions from the rear face of the paddle of the blade, and thus decrease the weight of the blade as well as the raw material costs. Further, the use of ribs allows a manufacturer to decrease the number of plies of fiber reinforcement material added to the blades, resulting in increased raw material cost savings without a decrease in stiffness or some other measurable blade performance criteria.

Thus, an individual utilizing the blade of the present invention can individually tailor a hockey stick based on a desired set of mechanical characteristics. For example, a player desiring a hockey blade with increased stiffness near the tip region of the paddle may select one blade in accordance with the present invention, while another player desiring a more flexible tip region and less flexible heel region would select another version of the blade in accordance with the present invention. Further, the blades may be formed with less raw materials without sacrificing stiffness and/or flexion.

These and other features and advantages of the present invention will become apparent from the following description of the invention, when viewed in accordance with the accompanying drawings and appended claims.

SUMMARY OF THE INVENTION

It is therefore an advantage of the present invention to provide a composite blade for a hockey stick with improved response while handling and/or shooting a puck.

It is another advantage of the present invention to provide a composite blade for a hockey stick that assists in preventing puck "flutter" that may occur when a player shoots or passes the puck.

It is a related advantage of the present invention to provide a composite blade for a hockey stick that minimizes twisting of the blade.

It is still another advantage of the present invention to provide a composite blade for a hockey stick that has decreased weight without adversely affecting the performance or mechanical characteristics of the blade.

In accordance with the above and the other advantages, the present invention provides a composite hockey stick blade having a rib stiffening system. The rib stiffening system consists of one or more ribs incorporated within a rear face of the paddle portion of the blade. The ribs create an internal wall structure that runs inwardly with respect to the rear face of the paddle portion. The ribs provide regions of increased stiffness within the overall structure of the paddle. The location of the rib or ribs allows the flexing and twisting characteristics of the paddle to be precisely controlled depending upon the blade's desired mechanical characteristics to enhance the player's shooting and passing ability. The addition of ribs horizontally along the length of the paddle is shown to increase the stiffness of the paddle longitudinally, while the addition of ribs semi-vertically increases the torsional rigidity of the paddle, therein minimizing twisting of the paddle that may occur during use, such as when a player shoots or passes a puck.

A secondary result of adding the rib stiffening system to the rear face of the paddle of the blade is an incremental decrease in the total weight of the blade, and a cost savings realization in terms of reduced material usage. In accordance with one embodiment, the ribs are essentially removed regions from the rear face of the paddle of the blade, and thus decrease the weight of the blade as well as the raw material costs. Further, the use of ribs allows a manufacturer to decrease the number of plies of fiber reinforcement material added to the blades, resulting in increased raw material cost savings without a decrease in stiffness or some other measurable blade performance criteria.

Thus, an individual utilizing the blade of the present invention can individually tailor a hockey stick based on a desired set of mechanical characteristics. For example, a player desiring a hockey blade with increased stiffness near the tip of the paddle may select one blade in accordance with the present invention, while another player desiring a more flexible tip region and less flexible heel region would select another version of the blade in accordance with the present invention. Further, the blades may be formed with less raw materials without sacrificing stiffness and/or flexion.

These and other features and advantages of the present invention will become apparent from the following description of the invention, when viewed in accordance with the accompanying drawings and appended claims.

BRIEF DESCRIPTION OF THE DRAWING

FIG. 4 is a view of the backside face of a blade according to yet another embodiment of the present invention;

FIG. 5 is a view of the backside face of a blade according to still another embodiment of the present invention FIG. 6A is a view of the backside face of a blade according to another embodiment of the present invention;

FIG. 6B is a cross-sectional view of a portion the blade of FIG. 6A in the direction of arrows 6B-6B;

FIG. 7A is a view of the backside face of a blade according to yet another embodiment of the present invention;

FIG. 7B is a cross-sectional view of a portion the blade of FIG. 7A in the direction of arrows 7B-7B; and FIG. 8 is a cross-sectional view of a two-piece mold used to form the blades of FIGS. 1-7 in accordance with one embodiment of the present invention.

DETAILED DESCRIPTION OF THE PREFERRED EMBODIMENT

Figure 2:
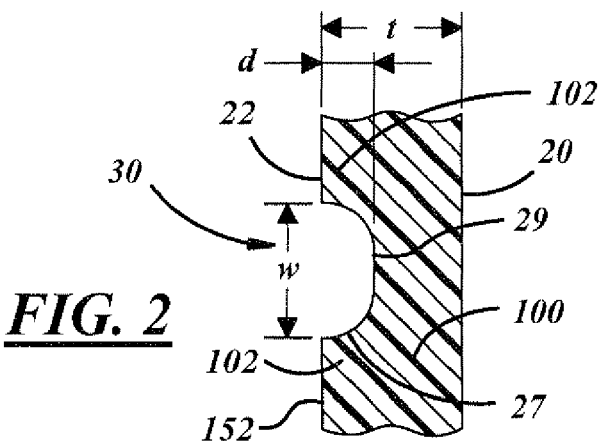
FIG. 2 is a cross-sectional view of a portion the blade of FIG. 1 in the direction of arrows 2-2.

Referring now to the FIGS. 1-7, a hockey blade 10 is depicted in accordance with any of at least six preferred embodiments of the present invention is disclosed. It should be understood that while the preferred blade is intended for use in the sport of ice hockey, it can also be utilized in other sports, including roller hockey and field hockey. In general, the blade 10 comprises a hosel 12, a heel section 14, and a paddle (blade portion) 16. The heel section 14 is located at the junction of the hosel 12 and the paddle 16. The hosel 12 includes a tenon 18, or insert, adapted to be inserted into a hollow hockey stick shaft (not shown) made of aluminum, composite or graphite. The paddle 16 includes a front face 20 and a rear face 22 and further comprises a top edge 24, a tip region 26 and a bottom edge 28.

The blade 10 according to any of the preferred embodiments shown in FIGS. 1, and 3-8, as shown in FIG. 2, is preferably formed as a composite structure having an inner foam core 100 overlaid, or sandwiched, with a plastic wrap 101. The plastic wrap 101 is preferably a fiber-reinforced prepreg material that includes one or more layers 102 comprising one or more plies 104 of substantially continuous fibers 106 disposed in a matrix or resin based material 108. Separate reinforcing layers 110 of the same type and quantity as plies 104 may be placed on the top edge 24 and the bottom edge 28 of the blade 10. It will be understood that the blade 10 may be formed as a replacement blade, i.e. separate from the shaft, or may alternatively be formed as a single integral unit with the shaft. Moreover, it will be understood that the inner foam core may be reinforced with materials other than plastic wrap 101 in other ways well known to those of ordinary skill in the art and is not meant to be limited to the preferred embodiment.

The hosel 12 and tenon 18 are preferably formed having one or more layers of the plastic wrap (shown as a plurality of plies 197 in FIG. 8) that are wrapped around a hollow cavity and may include an inner foam core (shown as 199 in FIG. 8).

The inner foam core 100, 199 may be constructed of formulations of expanding syntactic or non-syntactic foam, such as polyurethane, PVC, epoxy, or any other suitable material capable of providing the needed pressure (i.e. expansion during heating) in the mold while having a suitable or desired weight or density.

The fibers 106 employed in plies 104, 197 may be comprised of carbon fiber, aramid, glass, polyethylene, ceramic, boron, quartz, polyester or any other fiber that may provide the desired strength. The matrix or resin based material 108 is preferably selected from a group of resin based materials, including thermoplastic materials such as polyetherether-ketone ("PEEK"), polyphenylene sulfide ("PPS"), polyethylene ("PE"), polypropylene urethanes ("PPU"), and nylons such as Nylon-6. The matrix or resin based material 108 may also include or be entirely composed of a thermosetting material, such as urethanes, epoxy, vinyl ester, polycyanate, and polyester.

In order to avoid manufacturing expenses relating to transferring the resin into the mold after the foam-fiber layers are inserted into the mold, the matrix material 108 employed is preferably pre-impregnated into the plies 104 prior to the uncured blade assembly being inserted into the mold and the mold being sealed. In addition, in order to avoid costs associated with the woven sleeve materials employed in contemporary composite blade constructs, it is preferable that the layers be comprised of one or more plies 104 of non-woven uni-directional fibers. Suitable materials include unidirectional carbon fiber tape pre-impregnated with epoxy, uni-directional glass fiber tape pre-impregnated with epoxy, and uni-directional aramid fiber tape pre-impregnated with epoxy.

As used herein the term "ply" 104 shall mean a group of fibers which all run in a single direction, largely parallel to one another, and which may or may not be interwoven with or stitched to one or more other groups of fibers each of which may be or may not be disposed in a different direction. A "layer" 102 shall mean one or more plies 104 that are laid down together.

Referring back to FIGS. 1-7, the blade 10 includes an internal rib stiffening system, in the form of one or more ribs 23 that are introduced within the surface 152 of the rear face 22 at various locations from the heel section 14 to the tip region 26. The internal ribs 23 provide localized stiffening regions along the rear face 22 of the blade 10 and therefore minimize the flexing and twisting of the paddles 16 that occurs during usage by a player as he passes or shoot a puck. The configuration of the ribs 23 may vary in number, shape, location, depth, width, and length along the rear face 22 of the paddle 16, depending upon the desired stiffness and twisting requirements desired by the player. The internal rib stiffening system affects the overall "feel" of the hockey stick, as perceived by the player, while passing or shooting a puck. This also affects the characteristics of the shot or passed puck in terms of velocity and direction.

Despite having referred to the rib stiffening system as an "internal" rib stiffening system, the ribs 23 that form the rib stiffening system are preferably visible and extend generally inward from the external surface of the rear face 22 of the paddle 16, and thus may be considered to be externally located along the rear face 22 of the paddle 16. Alternatively, at least a portion of the rib stiffening system can project externally or generally outward from the rear face 22. The internal rib stiffening systems for six embodiments are described in more detail below in conjunction with FIGS. 1-7.

However, the present invention is not intended to be limited to the specific exemplary embodiments and can cover other rib stiffening systems as will be understood by those of ordinary skill in the art. Indeed, it will be understood that the ribs in each of the embodiments can have varying lengths, depths, and configurations.

Figure 1:
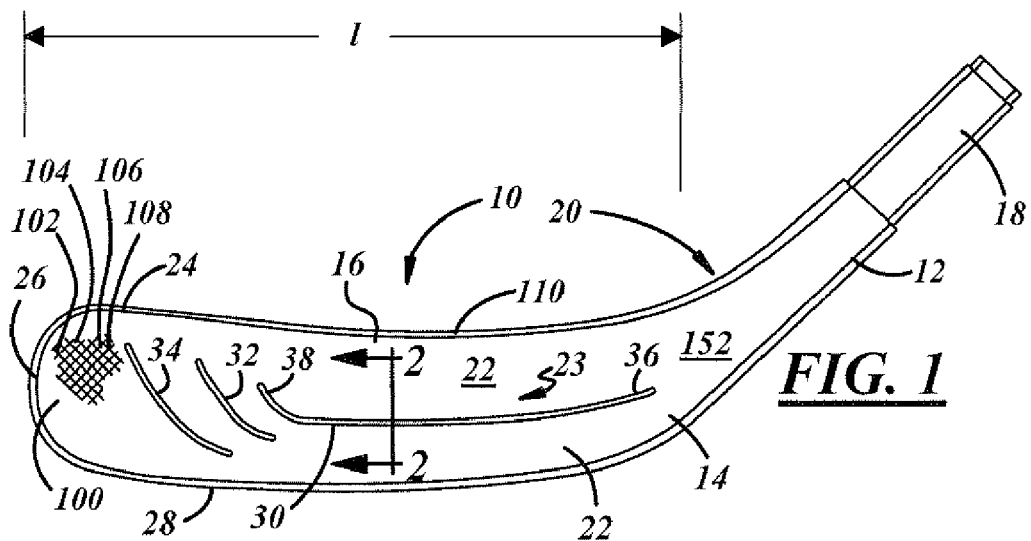
FIG. 1 is a view of the backside face of a blade according to one embodiment of the present invention.

As best shown in FIGS. 1 and 2, in one embodiment of the present invention, the rear face 22 includes an internal rib stiffening system formed in the blade 10 that consists of ribs 30, 32, 34 that extend perpendicular within the surface of the rear face 22.

The rib 30 includes a first portion 36 that extends along the rear face 22 of the blade 10 substantially parallel between the top edge 24 and the bottom edge 28 and a second portion 38 nearer to the tip region 26 that curves slightly upward towards the top edge 24. The rib 30 is designed to provide localized stiffening of the paddle 16 longitudinally relative to the length of the paddle 16 nearer to the heel section 14 than to the tip region 26. This minimizes the longitudinal flexing of the paddle 16 (wherein the tip region 26 flexes relative to the heel section 14 at a particular lag rate relative to the heel section 14) in a direction perpendicular to the length of the paddle 16 in the region of the rib 30 during compression of the paddle 16. Compression, or flexion energy, of the paddle 16 typically occurs in the heel section 14 and the middle of the paddle 16 when a player shoots or passes a puck while playing or practicing the game of hockey. Thus, the rib 30 minimizes the lag of the tip region 24 relative to the heel section 14 as the player shoots or passes the puck, which can cause a puck to travel more consistently online compared to blades not incorporating the rib 30.

The ribs 32, 34 are located closer to the tip region 26 than the rib 30. In one embodiment, the ribs 32, 34, extend in the direction from the bottom edge 28 towards the top edge 24 at an angle from the heel section 14 towards the tip section 26. The ribs 32, 34, or any rib extending semi-vertically relative to the length of the paddle 16, act to increase the torsional rigidity of the paddle 16. This minimizes twisting or "opening" of the top edge 24 of the paddle 16 near to the tip region 26 relative to the rest of the paddle 16 (i.e. wherein the flexion of the top edge 24 near the tip region 26 lags behind the flexion of the rest of the top edge 24 and behind the flexion of the bottom edge 28 in the tip region 26). The ribs thus aid in minimizing puck "flutter" that a player can experience when shooting or passing the puck which is normally attributed to or results from twisting of the paddle 16.

As shown in FIG. 2, the ribs 30, 32, 34 (here shown as representative rib 30) extend inwardly a certain depth (d) with respect to the rear face surface (as measured from the rear face surface to the valley, or bottom 29) and extend a certain width (w) perpendicular to the depth (d). The amount of the depth (d) and width (w), along with the location of the ribs 30, 32, 34 relative to the heel section 14 and the tip region 26, determine the amount of stiffening that occurs. In one embodiment, the depth (d) preferably does not exceed 80% of the thickness (t) of the paddle 16 at any location. However, it will also be understood that the depth (d) can extend all the way to the back of the front face 20 of the blade. As the thickness (t) of the paddle 16 portion preferably decreases from the heel section 14 towards the tip region 26, the depth (d) of the ribs 30, 32, 34 relative to the thickness (t) may vary accordingly along the paddle 16 length. The depths (d) of each rib 30, 32, 34 may vary with respect to one another or may vary individually along their respective lengths. Alternatively, the depth (d) may remain constant, depending upon the desired mechanical characteristics. The ribs 30, 32, 34 are preferably rounded 27 at the edges of the bottom, or valley 29, corresponding to the maximum depth (d) of the representative rib 30, 32, 34, to improve manufacturability and to eliminate or minimize stress risers associated with the start and stop point of the ribs 30, 32, 34.

Figures 3A, 3B:
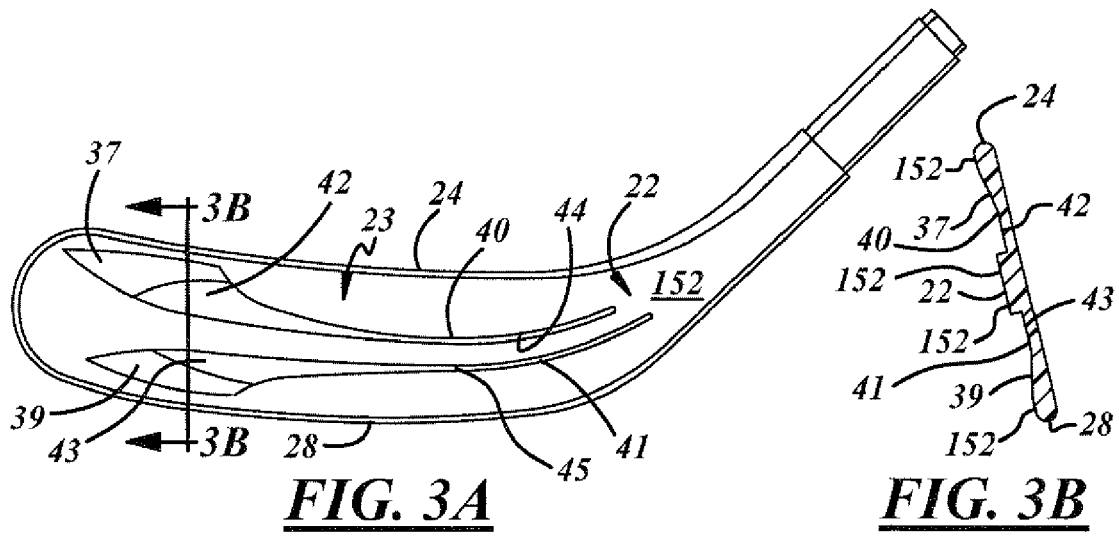
FIG. 3A is a view of the backside face of a blade according to yet another embodiment of the present invention.
FIG. 3B is a cross-sectional view of a portion the blade of FIG. 3A in the direction of arrows 3B-3B.

Referring now to FIGS. 3A and 3B, another embodiment of the blade 10 is shown in which the rib stiffening system includes a first rib 40 that extends along the length of the paddle 16 from a position near to the heel section 14 and terminates along the top edge 24 of the paddle 16 near the tip region 26. In this embodiment, the rib stiffening system 23 includes a second rib 41 that extends along the length of the paddle 16 nearer to the bottom edge 28 than the first rib 40. The second rib 41 begins generally at a position near the heel section 14 and terminates along the bottom edge 28 nearer to the tip region 26. Each of the ribs 40, 41 includes a widened region 42, 43 defined nearer to the tip region 26. The widened regions 42, 43 of each of the ribs 40, 41 terminates adjacent the respective edge 24, 28 and a narrower portion 44, 45 nearer to the heel region 14. In this embodiment, the narrower portions 44, 45 provide localized longitudinal stiffening of the paddle 16 along the length thereof in a similar manner as rib 30 of FIGS. 1 and 2, while the widened regions 42, 43 increase the torsional rigidity of the paddle 16 in the tip region 26 in a similar manner as described above with respect to ribs 32, 34 of FIGS. 1 and 2.

The widened regions 42, 43 each includes a blending region 37, 39, wherein the depth (d) of the respective blending region 37, 39 becomes shallower as it extends towards the respective top edge 24 or bottom edge until such time as it is flush with the surface 152 of the rear face 22

In still another embodiment as shown in FIG. 4, the blade 10 includes a rib stiffening system 23 consisting of ribs 46, 48, and 50 on the rear face 22 of the paddle 16. The first rib 46 is located near the tip region 26, and extends in an inverse "c" pattern in the direction from the top edge 24 to the bottom edge 26, with the uppermost end 52 disposed closer to the tip region 26 than the lowermost end 54. The first rib 46 acts to increase the torsional rigidity of the paddle 16 in the tip region 26. The second rib 48 includes a first portion 56 that follows the same path and has the same configuration as the first rib 46 and includes an uppermost end 58 and a lowermost end 60. The second rib 48 also includes a second portion 62 that extends along the length of the paddle 16 from a lowermost end 60 to a heel section end 66. The first portion 56 of the second rib 48, similar to rib 46, acts to increase the torsional rigidity of the paddle 16 further inward towards the heel section 14.

The second portion 62 preferably runs in the middle of the rear face 22 between the top edge 24 and the bottom edge 28 along its length, but preferably is not straight along its entire length. Thus, the second portion 62 may best be described as having a wavy structure extending closer to and further from the top edge 24, depending upon the location, from the lowermost end 60 to the heel section end 66. The third rib 50 extends along the length of the paddle 16 between the top edge 24 and the second portion 62. The third rib 50 generally flows the same path as the second portion 62 in the direction from the tip region 26 to the heel section 14. The second rib 48 and the third rib 50 therefore provide localized longitudinal stiffening of the paddle 16 along the length of the paddle 16 nearer to the heel section 14 than to the tip region 26.

In a further embodiment, as shown in FIG. 5, the rear face 22 of the blade 10 includes a rib stiffening system 23 including ribs 70, 72 that extend along the length of the paddle 16 in the direction from the heel section 14 towards the tip region 26. The first rib 70 begins at a first end 74 adjacent a junction between the heel section 14 and the paddle 16. The first rib 70 extends slightly downward towards a middle region 76 and then slightly upward to an uppermost end 80 nearer to the tip region 26. The first rib 70 then extends slightly downward to a second end 82 located very close to the tip region 26 approximately slightly above halfway between the top edge 24 and bottom edge 28. A generally triangular-shaped thickened region 84 is therefore defined in the first rib 70 adjacent the tip region 26.

The second rib 72 begins at a first end 84 adjacent the junction between the heel section 14 and the paddle 16 and extends slightly downward towards a middle region 86 and then slightly downward further to a lowermost end 88 nearer to the tip region 26. The second rib 72 then extends slightly upward to a second end 90 located very close to the tip region 26 approximately slightly above halfway between the top edge 24 and bottom edge 28. A generally triangular-shaped thickened region 92 is therefore defined in the second rib 72 adjacent the tip region 26.

The presence of two ribs 70, 72 that extend generally along the length of the paddle 16 provides localized longitudinal stiffening of the paddle 16 along the length of the paddle 16 nearer to the heel section 14 than to the tip region 26. The generally triangular shaped regions 84, 92 of the ribs 70, 72 increase the torsional rigidity of the paddle 16 in the tip region 26 along both the top edge 24 and the bottom edge 28.

Referring now to FIGS. 6A and 6B, the rear face 22 of the blade 10 includes a rib stiffening system 23 including ribs 110, 112 that extend along the length of the paddle 16 in the direction from the heel section 14 towards the tip region 26.

The first rib 110 includes a first portion 114 that is disposed between the top edge 24 and the bottom edge 28 which extends from the heel section end 116 to the middle portion point 118 located in the middle portion 120 of the rear face 22 of the paddle. The first portion 114 forms a slight concave or u-shaped curvature from its heel section end 116 to a middle portion point 118. A second portion 122 then extends downward from the middle portion point 118 towards the tip region 26 and the bottom edge 28 to a lowermost point 124 and includes a middle portion 146. The second portion 122 has a slightly concave shape or u-shape from the middle portion point 120 to the lowermost point 124. A third portion 126 extends upward and further towards the tip region 26 from the lowermost point 124 to a tip end 128.

The second rib 112 follows substantially the same path as the first rib 110 along its entire length from the heel section 14 to the tip portion 26. The second rib 112 has a first portion 130 that extends from a heel section end 129 to a middle portion point 131 located in the middle portion 120 of the rear face 22. The first portion 130 is also generally concave or has a slight u-shaped curvature from its heel section end 129 to the middle portion point 131. The second rib 112 also includes a second portion 132 that is located closer to the bottom edge of the blade 28 along its length than the respective first portion 114 and second portion 122, The second portion 132 has a slightly concave shape or u-shape from the middle portion point 131 to the lowermost point 144.

The second rib 112 also has a third portion 134 that generally tracks the same path as the third portion 126 of the first rib 110 along its length, but is closer to the heel section 114. The third portion 134 is actually two segments that are separated by a middle portion 146 of the second portion 122 and consists of a first segment 135 and a second segment 137, with the second segment terminating at an end point 139. The first segment 135 extends upward and further towards the tip region 26 from the lowermost point 144 to a middle portion 146 of the second portion 126. The first segment 135 of third portion 134 includes a blending region 148, wherein the depth (d) of the blending region 148 becomes shallower towards the middle portion 146 from the lowermost point 144 until such time as the blending region 148 is flush with the surface 152 of the rear face 22.

The second segment 137 of third portion 134 also includes a blending region 154, wherein the depth (d) of the blending region 154 becomes shallower as it extends towards the middle portion 146 from the end point 139 until such time as the blending region 154 is flush with the surface 152 of the rear face 22.

The presence of the respective first portions 114, 130 and second portions 122, 132 of the two ribs 110, 112 that extend along the length of the paddle 16 provides localized longitudinal stiffening of the paddle 16 along the length thereof. The respective third portions 126, 134 increase the torsional rigidity of the paddle 16 in the tip region 26 along both the top edge 24 and the bottom edge 28.

Referring now to FIGS. 7A and 7B, another preferred embodiment of the present invention is depicted having three separate ribs stiffening systems 23, namely a first rib 150, a second rib 153, and a third x-shaped rib 154.

The first rib 150 preferably extends along a rear face 22 of the blade 10 substantially parallel to both the top edge 24 and the bottom edge 28 along its length between the heel section 14 and a middle portion 116 of the rear face, but preferably is not straight along its entire length. Thus, the first rib 150 has a slight concave or u-shaped curvature from its heel section end 156 to a middle portion end 158. The second rib 153 runs along a rear face 22 of the blade 10 substantially parallel to the first rib 150 along its entire length from the heel section 114 to the tip portion 26 and is positioned slightly closer to the bottom edge of the blade 28. The first rib 150 and the second rib 152 provide localized longitudinal stiffening of the paddle 16 along the length thereof.

The x-shaped rib 154 is positioned closer to the tip region 26 than the first rib 150 and the second rib 153 and has four segments 160 extending diagonally with respect to the top edge 24 and the bottom edge 28 from a centralized intersection 162. Each of the segments 160 includes a blending tip region 164, wherein the depth (d) of the blending tip region 164 becomes shallower as it extends away from the intersection 162 and towards the respective top edge 24 or bottom edge 28 of the blade 10. Eventually, the end 166 of the blending tip region 164 is flush with the face 152 of the rear face 22. The x-shaped rib 154 increases the torsional rigidity of the paddle 16 in the tip region 26 along both the top edge 24 and the bottom edge 28.

Referring now to FIG. 8, one preferred method for forming the blade 10 of any of the preferred embodiments described above in FIGS. 1-7 is illustrated.

First, a mold 175, corresponding to the shape of the blade 10, is formed having an inner surface 180 in the form of a front surface 177, a rear surface 179, a top surface 181, and a bottom surface 183 that define a cavity 185 corresponding to the outer periphery of the front face 20, the rear face 22, the top edge 24 and the bottom edge 28. The mold 175 also includes an inner surface 187 corresponding to the outer periphery of the hosel 12, and therein defines a second cavity portion 189 that is preferably open and continuous with the cavity 185. The mold preferably consists of two or more mold pieces 191, 193 that close to define the cavities 185, 189 that corresponds to the shape of the blade 10. The mold also includes one or more raised regions 195 that correspond to and define the shape of the respective ribs 23 extending within the rear face 22. Thus, the raised region 195 does not exceed 80% of the thickness of the cavity 185 extending between the top surface 179 and bottom surface 181, and may be shaped with a rounded outer surface to form the rounded edges of the ribs 23, blending regions, and to incorporate the various features such as the x-shaped rib or ribs having thickened regions described above in FIGS. 1-7.

Next, one or more plies 104 of a plastic wrap 101, here pre-impregnated substantially continuous fibers comprising each respective face 22 or 24 of the blade 10, are placed into the mold 175 along the front surface 177 and the rear surface 179. In addition, one or more plies 197 of the pre-impregnated substantially continuous fibers are placed onto the outer surface 187 of the hosel region within the cavity region 189.

A long strip of reinforcement 110 is placed onto the bottom surface 183 of the mold and also encloses the plies 104. The reinforcement 110 preferably consists of one or more plies of the pre-impregnated substantially continuous fibers of similar composition to plies 104 and 197.

An inner foam core material 100 is then introduced within the plies 104 within the first cavity region 185 and optionally within the plies 197 of the second cavity region 189. Finally, a second strip of the reinforcement 110 is draped over the inner foam core 100 and plies 104 and will couple to the top surface 181 of the mold 175.

Last, the plies 104 for the other face 22 or 24 of the blade 10 are added or wrapped over a foam core 100 that is generally in the shape of the blade 10 illustrated in FIGS. 1 and 3-5 to create an uncured blade assembly 200.

The mold 175 is closed using an automated press or tightened down by hand using bolts (not shown). Heat is then applied to the mold 175 sufficient to cure the inner foam core 100 and the prepreg materials comprising the plies 104, 110, and 197. The heat also causes the foam core 100 to expand, therein exerting pressure on the plies 104, 110 and compacting the laminate structure. The heat also causes the foam core 199 to expand against plies 197 in the hosel 12. As one of ordinary skill will recognize, the amount of heat and time necessary to cure the inner foam core 100, 199 is dependent upon numerous factors, including but not limited to the chemical composition of the foam core 100, 199, the thickness of the foam core 100, 199 and the pressure exerted within the mold. For a polyurethane core foam material, the core is expanded and cured at about 260 degrees Fahrenheit (about 125 degrees Celsius) for one hour. When the mold cycle is complete, the blade 10 is then removed from the mold 175 and finished to the desired appearance. The finishing process may include aesthetic aspects such as paint or polishing and also may include structural modifications such as deburring.

Accordingly, the present invention provides a composite hockey stick blade 10 having a rib system 23 incorporated within a rear face 22 of the paddle 16. The ribs 23 create an internal wall structure that runs substantially perpendicular to the rear face 22 of the paddle 16. The ribs 23 provide localized regions of increased stiffness located within the overall structure of the paddle 16. The location of the ribs 23 allows the flexing and twisting characteristics of the paddle 16 to be precisely controlled depending upon the player's desired mechanical characteristics to enhance their shooting and passing ability. The addition of the rib or ribs 23 horizontally along the length of the paddle 16 is shown to increase the stiffness of the paddle 16 longitudinally, while the addition of rib or ribs 23 semi-vertically increases the torsional rigidity of the paddle 16, therein minimizing twisting of the paddle 16 that may occur during use, such as when a player shoots a puck.

A secondary result of adding the rib stiffening systems to the rear face 22 is an incremental decrease in the total weight of the blade 10, and a cost savings realization in terms of reduced material usage. The ribs 23 are essentially removed regions from the rear face 22 of the paddle 16, and thus decrease the weight of the blades and raw material costs accordingly. Further, the use of ribs 23 may allow a manufacturer to decrease the number of plies of fiber reinforcement material added to the paddle 16, resulting in increased raw material costs savings without a decrease in stiffness or some other measurable blade performance criteria.

Thus, an individual utilizing the composite blade of the present invention can individually tailor a hockey stick based on a desired set of mechanical characteristics. For example, a player desiring a hockey blade with increased stiffness near the tip of the paddle may select one blade in accordance with the present invention, while another player desiring a more flexible tip region and less flexible heel region would select another version of the blade in accordance with the present invention. The composite paddle of the present invention is ideally suited for use as a replacement blade for two-piece hockey sticks, wherein the hosel 12 is coated with glue on an outer surface and introduced within a hollow shaft of a hockey stick and heated to adhere the glue to the inner surface of the hockey stick shaft.

However, the present invention is also ideally suited for use in a one piece hockey stick (i.e. without a replaceable hockey stick blade), wherein the hockey stick shaft is co-formed with the paddle and hosel. Here, the shaft region, which is simply an extension of the hosel 12, if formed simultaneously with the paddle 16 in accordance with the method of FIG. 8.

While particular embodiments of the invention have been shown and described, numerous variations or alternate embodiments will occur to those skilled in the art. Accordingly, it is intended that the invention be limited only in terms of the appended claims.

What is claimed is:

1. A method for forming a hockey stick blade having improved stiffness, the method comprising:

providing a mold corresponding to the shape of the hockey stick blade, said mold including a longitudinal length corresponding to the longitudinal length of the hockey stick blade, a top surface, a bottom surface, a front surface and a rear surface and defining a first cavity therein, the rear surface including at least one raised region, the raised region having a longitudinal length, a substantially rounded outer surface, a width, and a depth defined as the distance between said rear surface of said mold and said substantially rounded outer surface of said raised region, said depth of said raised region varying along said longitudinal length of said raised region:

coupling a sheet of plastic wrap to said front surface of said mold;

coupling another sheet of plastic wrap to said rear surface of said mold and said raised region:

introducing a first reinforcement strip onto said bottom surface of said mold;

introducing a second reinforcement strip onto said top surface of said mold;

introducing an inner foam core material within said first cavity between said plastic wrap on said front surface of said mold, said plastic wrap on said rear surface of said mold, said first reinforcement strip, and said second reinforcement strip;

closing said mold;

introducing heat and pressure within said mold to cure said inner foam core material and to expand said foam core material within said first cavity against said plastic wrap located along said front surface and said rear surface of said mold; said inner foam core material also expanding against said first reinforcement strip and said second reinforcement strip; and removing the hockey stick blade from said mold;

wherein, due to said at least one raised region, the resultant hockey stick blade has a visible, exposed and substantially rounded rib stiffening system of varying depth defined in a rear surface thereof.

2. The method of claim 1, wherein said plastic wrap comprises one or more plies of a pre-impregnated continuous fiber material.

3. The method of claim 1, wherein said first reinforcement material and said second reinforcement material each comprise one or more plies of a pre-impregnated continuous fiber material.

4. The method of claim 1, wherein said inner foam core material comprises a syntactic foam material.

5. The method of claim 1, wherein said rib stiffening system defines a width, said width of said raised region varying along said longitudinal length of said raised region.

6. The method of claim 1, wherein said inner foam core material comprises a polyurethane foam material.

7. The method of claim 1, wherein said depth of said at least one raised region does not extend within said cavity farther than about 80% of the distance between said front surface and a rear surface.

8. A method for forming a two-piece hockey stick having a hockey stick blade with improved stiffness, the method comprising:

(a) forming a paddle portion of the hockey stick blade, the method comprising:

providing a mold surface corresponding to the shape of the paddle portion, said mold including a longitudinal length corresponding to the longitudinal length of the hockey stick blade, a top surface, a bottom surface, a front surface and a rear surface and defining a first cavity therein, the rear surface including at least one raised region, the raised region having a longitudinal length, a substantially rounded outer surface, a width, and a depth defined as the distance between said rear surface of said mold and said substantially rounded outer surface of said raised region, said width of said raised region varying along said longitudinal length of said raised region;

coupling a plastic wrap to said front surface of said mold;

coupling said plastic wrap to said rear surface of said mold and said raised region;

introducing a first reinforcement strip onto said bottom surface of said mold;

introducing a second reinforcement strip onto said top surface of said mold;

introducing an inner foam core material within said first cavity between said plastic wrap on said front surface of said mold, said plastic wrap on said rear surface of said mold, said first reinforcement strip, and said second reinforcement strip;

closing said mold;

introducing heat and pressure within said mold to sure said inner foam core material and to expand said foam core material within said first cavity against said plastic wrap located along said front surface and said rear surface of said mold; said inner foam core material also expanding against said first reinforcement strip and said second reinforcement strip; and removing the hockey stick blade from said mold;

wherein, due to said at least one raised region, the resultant hockey stick blade has a visible, exposed and substantially rounded rib stiffening system of varying width defined in a rear surface thereof;

(b) forming a hosel within a second cavity region of said mold, said second cavity region coupled with said first cavity region (c) providing a hockey stick shaft; and (d) coupling said hosel to said hockey stick shaft.

9. The method of claim 8, wherein the depth of the raised region varies along the longitudinal length of the raised region.

10. The method of claim 8 wherein raised region is shaped to form blending regions in the resultant hockey stick blade, wherein the depth of the rib stiffening system becomes shallower as it extends towards one of a top edge and a bottom edge of the rib stiffening system.

11. The method of claim 8 wherein the step of providing the mold surface includes providing a second raised region on the rear surface of the mold, the second raised region and the raised region converging toward each other along the longitudinal length of the paddle portion.

12. The method of claim 8 wherein the step of providing the mold surface includes providing the raised region with a first portion extending generally along the longitudinal length of the paddle portion and a second portion curving from the first portion and extending from a first position nearer to the bottom surface of the mold to a second position nearer to the top surface of the mold, wherein, due to the first and second portions of the raised region, the first portion of the rib stiffening system in the resultant hockey stick blade provides localized longitudinal stiffening of the paddle portion, and the second portion provides localized torsional rigidity of the paddle portion.

13. The method of claim 8 wherein said depth of said at least one raised region does not extend completely across said cavity from said front surface to said rear surface of said mold, such that the rib stiffening system of the resultant hockey stick blade does not extend the entire distance between said front surface and said rear surface of said mold.

14. The method of claim 13 wherein said depth of said at least one raised region does not extend within said cavity farther than about 80% of the distance between said front surface and a rear surface.

* * * * *